(12) United States Patent
Mei et al.

(10) Patent No.: US 10,644,325 B2
(45) Date of Patent: May 5, 2020

(54) POROUS CATALYST LAYER, MEMBRANE ELECTRODE ASSEMBLY, AND ELECTROCHEMICAL CELL

(71) Applicant: KABUSHIKI KAISHA TOSHIBA, Tokyo (JP)

(72) Inventors: Wu Mei, Kanagawa (JP); Shigeru Matake, Kanagawa (JP); Taishi Fukazawa, Kanagawa (JP); Yoshihiro Akasaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 167 days.

(21) Appl. No.: 15/184,156

(22) Filed: Jun. 16, 2016

(65) Prior Publication Data

US 2016/0301081 A1    Oct. 13, 2016

Related U.S. Application Data

(63) Continuation of application No. PCT/JP2014/080790, filed on Nov. 20, 2014.

(30) Foreign Application Priority Data

Dec. 19, 2013    (JP) ................. 2013-263100

(51) Int. Cl.
*H01M 4/86* (2006.01)
*H01M 4/92* (2006.01)
(Continued)

(52) U.S. Cl.
CPC ....... *H01M 4/8657* (2013.01); *H01M 4/8605* (2013.01); *H01M 4/8817* (2013.01);
(Continued)

(58) Field of Classification Search
None
See application file for complete search history.

(56) References Cited

U.S. PATENT DOCUMENTS

| 2002/0110724 A1 | 8/2002 | Yamaura et al. |
| 2004/0076870 A1 | 4/2004 | Tanaka et al. |

(Continued)

FOREIGN PATENT DOCUMENTS

| JP | 2007-507328 | 3/2007 |
| JP | 2007-257888 | 10/2007 |

(Continued)

OTHER PUBLICATIONS

Notification of Transmittal of Copies of Translation of the International Preliminary Report on Patentability Issued by The International Bureau of WIPO, dated Jun. 30, 2016 (2 pages).

(Continued)

*Primary Examiner* — Haixia Zhang
(74) *Attorney, Agent, or Firm* — Finnegan, Henderson, Farabow, Garrett & Dunner, L.L.P.

(57) ABSTRACT

According to an embodiment, a porous catalyst layer includes a metal portion including plural noble metal-including sheets stacked apart from each other, and a porous nanocarbon layer disposed between two adjacent noble metal-including sheets. The plural noble metal-including sheets in the metal portion have an integrated portion. The porous nanocarbon layer includes fibrous nanocarbon.

14 Claims, 5 Drawing Sheets

(51) Int. Cl.
*H01M 4/88* (2006.01)
*H01M 8/0234* (2016.01)
*H01M 8/1004* (2016.01)
*H01M 8/1018* (2016.01)

(52) U.S. Cl.
CPC ............ *H01M 4/92* (2013.01); *H01M 4/926* (2013.01); *H01M 8/0234* (2013.01); *H01M 8/1004* (2013.01); *H01M 4/86* (2013.01); *H01M 2008/1095* (2013.01)

(56) References Cited

U.S. PATENT DOCUMENTS

| | | | |
|---|---|---|---|
| 2005/0069755 | A1 | 3/2005 | Vernstrom et al. |
| 2006/0002844 | A1* | 1/2006 | Suenaga ............... B82Y 30/00 423/447.3 |
| 2008/0230171 | A1 | 9/2008 | Mei et al. |
| 2010/0021787 | A1 | 1/2010 | Wu et al. |
| 2010/0239950 | A1 | 9/2010 | Mei et al. |
| 2012/0164555 | A1 | 6/2012 | Yamazaki et al. |
| 2012/0251915 | A1* | 10/2012 | Mei ..................... H01M 8/1004 429/479 |
| 2013/0078549 | A1 | 3/2013 | Fukazawa et al. |
| 2013/0078550 | A1 | 3/2013 | Mei et al. |
| 2013/0252132 | A1 | 9/2013 | Mei et al. |

FOREIGN PATENT DOCUMENTS

| | | |
|---|---|---|
| JP | 2008-21609 | 1/2008 |
| JP | 2008-108594 | 5/2008 |
| JP | 2009-64591 | 3/2009 |
| JP | 2010-33759 | 2/2010 |
| JP | 2010-221080 | 10/2010 |
| JP | 4740179 | 8/2011 |
| JP | 2012-204221 | 10/2012 |
| JP | 2013-73695 | 4/2013 |
| JP | 2013-82999 | 5/2013 |
| JP | 2013-226537 | 11/2013 |
| WO | WO 02/27850 A1 | 4/2002 |
| WO | WO 02/073722 A1 | 9/2002 |
| WO | WO 2011/036749 A1 | 3/2011 |

OTHER PUBLICATIONS

Written Opinion of the International Searching Authority Issued by The International Bureau of WIPO, dated Feb. 24, 2015 (5 pages).

* cited by examiner

POROUS CATALYST LAYER, MEMBRANE ELECTRODE ASSEMBLY, AND ELECTROCHEMICAL CELL

CROSS-REFERENCE TO RELATED APPLICATIONS

This application is a Continuation Application of PCT Application No. PCT/JP2014/080790, filed Nov. 20, 2014 and based upon and claiming the benefit of Japanese Patent Application No. 2013-263100, filed Dec. 19, 2013, the entire contents of all of which are incorporated herein by reference.

FIELD

Embodiments described herein relate generally to a porous catalyst layer, a membrane electrode assembly, and an electrochemical cell.

BACKGROUND

Recently, electrochemical cells have actively been studied. Of these electrochemical cells, as an example a fuel cell includes a system which generates electricity by an electrochemical reaction between fuel such as hydrogen and an oxidizing agent such as oxygen. In particular, a PEFC (Polymer Electrolyte Fuel Cell) has been put into practical use as a domestic stationary power supply or automobile power supply because the influence on the environment is small. This PEFC generates water as a reaction product, and can operate at a temperature lower than those of other fuel cells. One big objective for the spread of PEFC is cost reduction by reducing the amount of use of noble metal catalyst.

As a catalyst layer included in each electrode of the PEFC, a carbon-supported catalyst obtained by supporting a catalyst material by a carbon black support is generally used.

When the PEFC is used as, e.g., an automobile power supply, the carbon support included in the catalyst layer on the cathode side becomes corroded by start and stop, and the catalyst itself supported by the carbon support also dissolves. It has been reported that this accelerates deterioration of the catalyst layer and an MEA (Membrane Electrode Assembly) including the catalyst layer. In order to secure sufficient durability, adopting of a carbonless catalyst layer formed by sputtering or vapor-depositing a large amount of catalyst has been considered. An example is a catalyst layer obtained by sputtering platinum on a whisker substrate.

By being carbonless, deterioration of the catalyst support due to corrosion can be avoided, and the amount of noble metal catalyst used can be reduced. However, the properties of such catalyst layers become unstable when a highly humid fuel is supplied. When such a catalyst layer is applied to the cathode side of a fuel cell, water generated by the electrode reaction causes a water flooding phenomenon, and property deterioration occurring near room temperature is particularly significant. Accordingly, demands have arisen for a high-durability catalyst layer having good humidity robustness (i.e., a catalyst layer favorable in terms of humidity dependence). Since carbon is hydrophobic, introducing carbon to the noble metal catalyst layer is advantageous from the viewpoint of water handling. Methods such as introducing fibrous carbon between stacked platinum sheets have been proposed. However, properties when platinum amount is little are still unsatisfactory and needs further improvement.

DETAILED DESCRIPTION

According to an embodiment, a porous catalyst layer includes a metal portion including plural noble metal-including sheets stacked apart from each other, and a porous nanocarbon layer disposed between two adjacent noble metal-including sheets. The plural noble metal-including sheets in the metal portion have an integrated portion. The porous nanocarbon layer includes fibrous nanocarbon.

Embodiments will be explained in detail below with reference to the accompanying drawings.

Figure 1:
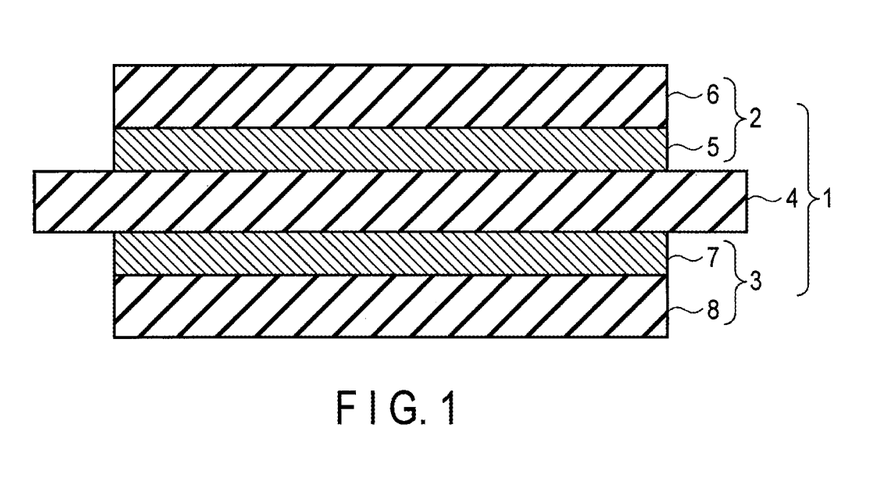
FIG. 1 is a cross-sectional view of a membrane electrode assembly according to an embodiment.

FIG. 1 is a cross-sectional view of a membrane electrode assembly (MEA) according to an embodiment.

An MEA 1 includes a first electrode 2, a second electrode 3, and an electrolyte membrane 4 disposed therebetween. The first electrode 2 includes a first catalyst layer 5 in contact with the electrolyte membrane 4, and a first gas diffusion layer 6 stacked thereon. The second electrode 3 includes a second catalyst layer 7 in contact with the electrolyte membrane 4, and a second gas diffusion layer 8 stacked thereon.

At least one of the first catalyst layer 5 and second catalyst layer 7 is formed of a catalyst layer of the embodiment, described below in detail. Preferably, both the first catalyst layer 5 and second catalyst layer 7 are formed of the catalyst layer of the embodiment. In this case, catalyst materials included in the first catalyst layer 5 and second catalyst layer 7 may be the same or different.

The electrolyte membrane 4 includes, e.g., a proton-conductive electrolyte. The electrolyte membrane 4 conducts hydrogen ions, which are derived from fuel supplied to the first electrode 2, to the second electrode 3. As the proton-conducive electrolyte, it is possible to use, e.g., fluorine resin having a sulfonic acid group (e.g., Nafion® (available from DuPont), Flemion® (available from Asahi Glass), and Aciplex® (available from Asahi Kasei)), and inorganic materials such as tungstic acid and phosphotungstic acid.

The thickness of the electrolyte membrane 4 may be determined appropriately by taking account of the properties of the MEA 1. From the viewpoints of strength, dissolution resistance, and output property of the MEA 1, the thickness of the electrolyte membrane 4 is preferably 5 to 300 μm, and more preferably, 10 to 150 μm.

When using the MEA 1 in a fuel cell, the first electrode 2 and second electrode 3 are respectively an anode and cathode. Hydrogen is supplied to the anode, and oxygen is supplied to the cathode.

The first gas diffusion layer 6 and second gas diffusion layer 8 (collectively referred to as "the gas diffusion layers 6 and 8", hereinafter) preferably include a water repellent. The water repellent increases the water repellency of the gas diffusion layers 6 and 8, and prevents a so-called flooding phenomenon by which water generated by power generation is not discharged from within the catalyst layers 5 and 7 and causes water clogging. Examples of the water repellent are fluorine-based polymer materials such as polytetrafluoroethylene (PTFE), polyvinylidene fluoride (PVDF), polyhexafluoropropylene, and a tetrafluoroethylene-hexafluoropropylene copolymer (FEP). The water repellent is introduced to the gas diffusion layers 6 and 8 after the catalyst layers 5 and 7 are formed.

The first catalyst layer 5 and second catalyst layer 7 (referred to as "the catalyst layers 5 and 7") will be explained in detail below.

The catalyst layers 5 and 7 include a catalyst material. The catalyst material includes at least one type of element selected from the group consisting of noble metal elements such as Pt, Ru, Rh, Os, Ir, Pd, and Au. Such catalyst materials are superior in catalyst activity, electric conductivity, and stability. The above-described metals may also be used as oxides. It is also possible to use a composite oxide or oxide mixture including two or more types of metals.

An optimum noble metal element may be selected appropriately in accordance with a reaction for which the MEA is used.

When using the catalyst layers 5 and 7 in a hydrogen oxidizing reaction or hydrogen generating reaction, the catalyst layers 5 and 7 include, e.g., Pt.

When using the catalyst layers 5 and 7 in an oxidizing reaction of a CO-including reformed hydrogen gas or alcohol such as methanol or ethanol, the catalyst layers 5 and 7 include, e.g., an alloy having a composition indicated by $Pt_Y Ru_Z T_{1-Y-Z}$ where Y is $0.2 \leq Y \leq 0.8$, Z is $0 \leq Z \leq 0.8$, and an element T is at least one kind of element selected from the group consisting of W, Hf, Si, Mo, Ta, Ti, Zr, Ni, Co, Nb, V, Sn, Al, and Cr. This alloy includes 20 atom % to 80 atom % of Pt, 0 atom % to 80 atom % of Ru, and 0 atom % to 80 atom % of the element T.

When using the catalyst layers 5 and 7 in an oxygen reducing reaction, the catalyst layers 5 and 7 include, e.g., an alloy having a composition indicated by $Pt_U M_{1-U}$ where U is $0<U \leq 0.9$, and an element M is at least one kind of element selected from the group consisting of Co, Ni, Fe, Mn, Ta, W, Hf, Si, Mo, Ti, Zr, Nb, V, Cr, Al, and Sn. This alloy includes more than 0 atom % and less than or equal to 90 atom % of Pt, and 10 atom % or more and less than 100 atom % of the element M.

When using the catalyst layers 5 and 7 in an oxygen generating reaction, the catalyst layers 5 and 7 include, e.g., an oxide of at least one kind of metal selected from the group consisting of Ir, Ru, Pt, Au, Rh, and Os. Alternatively, the catalyst layers 5 and 7 include a composite oxide of these oxides and an oxide of Ta or Sn. When the catalyst layers 5 and 7 include 30 atom % or more of Pt or Ir, both the activity and durability of the catalyst material can be achieved.

Figure 2:
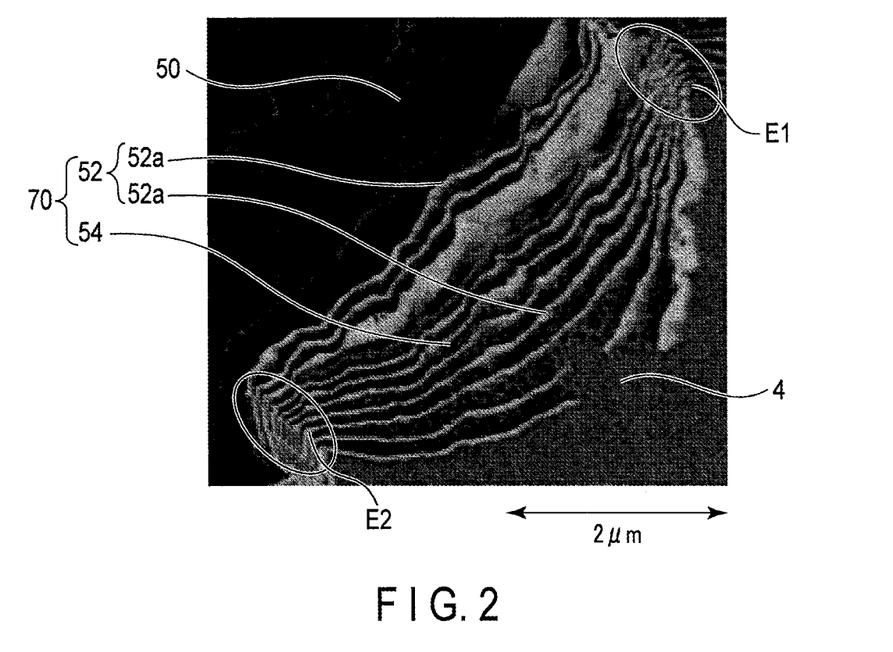
FIG. 2 is a view showing an image of a catalyst layer according to an embodiment as observed by a scanning electron microscope.
Figure 3:
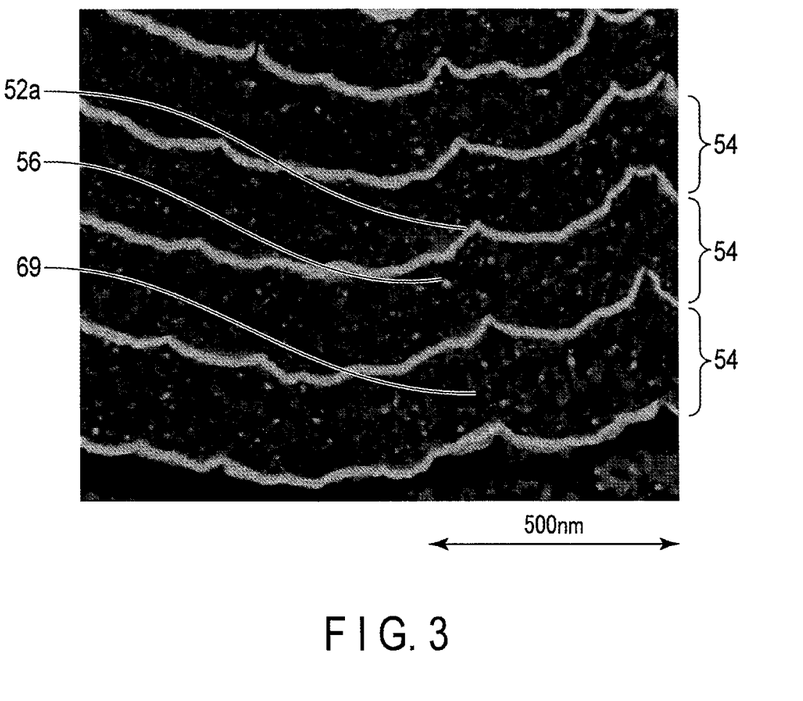
FIG. 3 is an enlarged view of the observed image shown in FIG. 2.

FIG. 2 shows an image of the porous catalyst layer of the embodiment observed at a magnification of 200,000 using SEM (Scanning Electron Microscope). FIG. 3 shows an enlarged photograph of the image. The structure of the catalyst layer slightly changes in accordance with the manufacturing process and composition. Basically, however, as shown in FIG. 2, a porous catalyst layer 70 includes plural stacked noble metal-including sheets 52a, and the plural noble metal-including sheets 52a are integrated at end portions E1 and E2, thereby forming a metal portion 52. A porous nanocarbon layer 54 including fibrous nanocarbon exists between two adjacent noble metal-including sheets 52a. As shown in FIG. 3, the porous nanocarbon layer 54 is basically a porous layer including fibrous nanocarbon 69, and a carbon synthetic catalyst 56 sometimes exists.

Note that in FIG. 2, reference number 50 denotes a substrate, and reference number 4 denotes an electrolyte membrane.

The reaction field of the electrode is limited to a triphasic interface of the catalyst material, the proton-conductive substance, and fuel. To obtain sufficient properties in an electrochemical cell including a conventional catalyst layer using carbon-supported platinum nanoparticles including a noble metal (platinum) as the catalyst material, the catalyst layer needed to include the proton-conductive substance.

To increase the utilization efficiency of a noble metal, the proton-conductive substance is required to exist on the catalyst surface at an appropriate thickness. The proton-conductive substance is also required to be connected to a proton-conductive membrane. Therefore, the utilization efficiency of a noble metal is 40% to 75% in the conventional catalyst layer including a polymeric proton-conductive substance. On the other hand, in a catalyst layer manufactured by sputtering and including a continuous platinum membrane catalyst, the utilization efficiency of a noble metal reaches 90% even if no proton-conductive substance is included.

Also, proton-conductive mechanisms different from the conventional have been proposed. An example is a model in which hydrogen atoms move to the surface of a platinum sheet instead of protons.

In the present embodiment, the metal portion 52 is formed by partially integrating the plural stacked noble metal-including sheets 52a, and the porous nanocarbon layer 54 including fibrous carbon is disposed between two adjacent noble metal-including sheets 52a. This makes it possible to achieve good humidity robustness even with a small amount of noble metal used. In the porous catalyst layer 70 of this embodiment, therefore, the plural basic metal-including sheets 52a are integrated at, e.g., the end portions E1 and E2.

The noble metal-including sheet 52a of the porous catalyst layer 70 preferably includes 20 atom % or more of at least one kind of metal selected from the group consisting of Pt, Ir, Ru, Au, Pd, Rh, and Ag. When durability is taken into account, Pt is advantageous as the noble metal.

The noble metal-including sheet 52a may have a multi-layered structure such as a sandwich structure. The amount of noble metal used can be reduced by forming only the noble metal or forming a large amount of the noble metal in the surface portion of the noble metal-including sheet 52a. In this case, by taking account of the durability and catalyst activity, it is possible to optimize the thickness and composition of the noble metal in the surface portion and the material thickness, composition, structure, and the like in the interior of the noble metal-including sheet 52a in accordance with the use conditions.

Note that metals other than Pt, Ir, Ru, Au, Pd, Rh, and Ag are referred to as base metals. A large amount of a base metal may be formed in the surface portion of the noble metal-including sheet 52a. More specifically, about twice more is formed in the surface than in other portions. Thereby, a unique surface composition and surface structure can be formed, thus improving the catalyst activity, and in some cases reducing the amount of the noble metal used.

The noble metal-including sheet 52a may have pores. When the noble metal-including sheet 52a is porous, the movement of a substance such as the discharge of water becomes smoother. As a result, the properties of the electrochemical cell can further be improved even when the amount of noble metal used is small. The porosity of the noble metal-including sheet 52a is preferably 20 to 80 vol. %. When the porosity of the noble metal-including sheet 52a falls within this range, a substance can sufficiently be moved without decreasing the utilization efficiency of the noble metal.

In the porous catalyst layer 70, a maximum distance between two adjacent noble metal-including sheets 52a is desirably 30 nm to 400 nm. When the maximum distance between the two noble metal-including sheets falls within this range, a substance is smoothly moved, and there is no adverse effect on the property of the electrochemical cell. The maximum distance between adjacent noble metal-including sheets 52a is more desirably 40 nm to 300 nm.

When taking account of the humidity dependence and low-temperature start in the power generating environment of a fuel cell, the maximum distance between adjacent noble metal-including sheets 52a is preferably 100 to 400 nm in some cases. The maximum distance between two noble metal-including sheets 52a in the porous catalyst layer 70 can be controlled by, e.g., the used amount of porogen (pore forming agent) as described later, and the sputtering conditions.

As explained above with reference to FIG. 3, the fibrous nanocarbon 69 is included in the porous nanocarbon layer 54 between adjacent noble metal-including sheets 52a, and in some cases, a carbon synthesizing catalyst material 56 also exists. The existence of the porous nanocarbon layer 54 between adjacent noble metal-including sheets 52a improves the catalyst layer in terms of humidity dependence, particularly, the high-humidity property. When compared to nanocarbon having another shape, fibrous nanocarbon readily forms pores. The porous nanocarbon layer 54 including such a fibrous nanocarbon 69 can promote the discharge of water and the diffusion of a fuel gas.

In the embodiment, the aspect ratio of the fibrous nanocarbon 69 is preferably 3 or more, and 80% of the fibrous nanocarbon desirably has a diameter of 2 to 200 nm. Fibrous nanocarbon meeting these conditions is favorable because a high porosity is obtained and continuous pores are formed. Note that the aspect ratio of fibrous nanocarbon is defined as the ratio of the length to the diameter of the fibrous nanocarbon. For example, the aspect ratio can be obtained by measuring the length and diameter of fibrous nanocarbon by high-magnification SEM or TEM observation.

The structure of the fibrous nanocarbon is not particularly limited, and a carbon nanofiber or carbon nanotube may be used. Note that when the surface is crystalline, the hydrophobic nature of the fibrous nanocarbon can be improved.

In the porous nanocarbon layer 54 between adjacent noble metal-including sheets 52a, the proportion occupied by the fibrous nanocarbon 69 is preferably 10 vol. % to 60 vol. %. When the fibrous nanocarbon is included within this range, desired effects can be obtained without interfering with the smooth discharge of water and the sufficient diffusion of a fuel gas. The proportion of the fibrous nanocarbon is more preferably 20 vol. % to 50 vol. %. The proportion of the fibrous nanocarbon in the porous nanocarbon layer 54 can be controlled by, e.g., the amount and composition of a catalyst for synthesizing fibrous carbon, as described later, and the synthesis conditions of the fibrous carbon.

The porous catalyst layer 70 according to the embodiment can be manufactured by a method including disposing an interlayer including a porogen and a carbon synthesizing catalyst between adjacent noble metal-including sheets, thereby obtaining a starting stack, removing the porogen from the starting stack, and partially integrating the noble metal-including sheets, thereby obtaining a gap-including stack, synthesizing fibrous nanocarbon by thermal CVD, thereby obtaining a fiber-including stack that includes the fibrous nanocarbon, and removing the carbon synthesizing catalyst from the fiber-including stack.

A method of manufacturing the porous catalyst layer according to the embodiment will be explained with reference to FIGS. 4A, 4B, 4C, and 4D.

Figure 4A:
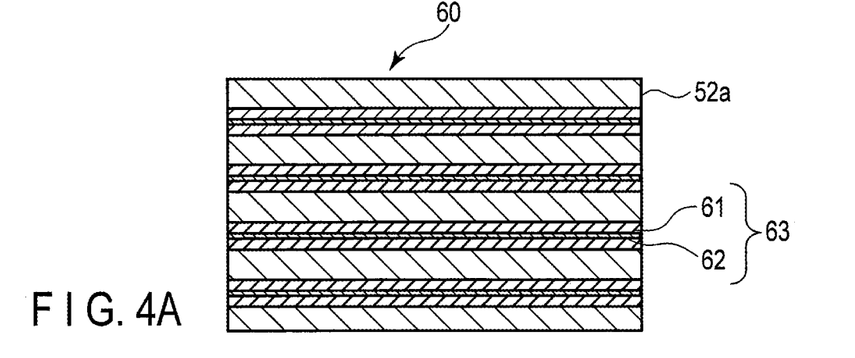
FIGS. 4A, 4B, 4C, and 4D are schematic views showing a method of manufacturing the catalyst layer according to the embodiment.

First, as shown in FIG. 4A, an interlayer 63 including a porogen layer 61 and a carbon synthesizing catalyst layer 62 is disposed between plural noble metal-including sheets 52a including a catalyst material, thereby forming a starting stack 60 on a substrate (not shown). The porogen layer 61 and carbon synthesizing catalyst layer 62 may be formed by sputtering or vapor deposition. Alternatively, the interlayer 63 may be formed by performing sputtering or vapor deposition by using a target of a mixture including a carbon synthesizing catalyst and pore forming agent.

When the interlayer 63 having a multilayered structure is disposed, uniform fibrous nanocarbon can be easily synthesized. Alternatively, the porogen layer 61 and carbon synthetic catalyst layer 62 may be sequentially formed. Porogen layers 61 may also be formed on reverse sides of the carbon synthesizing catalyst layer 62. When using the target of the mixture including the porogen and carbon synthesizing catalyst, a carbon synthesizing catalyst layer with the porogen mixed-in is obtained.

The pore forming agent is required to have solubility toward a washing agent (solution), which is described later, that is higher than that of the catalyst material (a noble metal). For example, a metal or metal oxide may be used as the porogen. A metal is preferably used as the porogen because it can be deposited and removed within short time periods, is excellent in workability, and is low in cost. The metal may be selected from the group consisting of Mn, Fe, Co, Ni, Zn, Sn, Al, and Cu. Particles of ceramics such as an oxide or nitride may also be used as the porogen. When using plural kinds of porogens, an appropriate pore structure can be formed. The porogen will be explained below, taking a pore forming metal as an example.

The catalyst for synthesizing the fibrous nanocarbon is not particularly limited, and a first metal selected from, e.g., Ni, Co, and Fe may be used. The first metal may also be used as an alloy with a second metal selected from, e.g., Al, Zn, Sn, and Cu. Furthermore, a general synthesizing catalyst such as a mixture of the first metal and another substance may be used as the carbon synthesizing catalyst. To prevent adhesion of the noble metal-including sheets 52a due to high-temperature processing, it is favorable to use an Ni- or Co-based synthesizing catalyst in which the synthesis temperature of fibrous carbon can be suppressed low.

When performing sputtering or vapor deposition, the structure and stability of an oxide can be adjusted by introducing oxygen to the sputtering or vapor deposition environment. The oxygen partial pressure in the environment is preferably less than 20%. When removing the porogen (pore forming metal) from the starting stack 60, the porogen may not be completely removed. Therefore, the proportion occupied by the porogen in the starting stack 60 may be made higher than the target porosity.

Figure 4B:
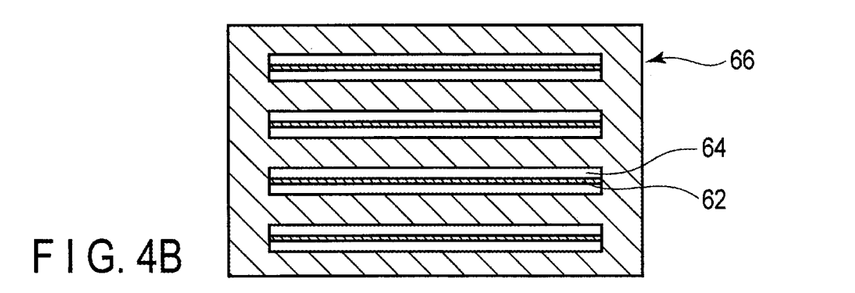

Subsequently, as shown in FIG. 4B, the porogen is selectively removed from the starting stack 60, thereby forming a gap layer 64 between the noble metal-including sheet 52a and carbon synthesizing catalyst layer 62. More specifically, the porogen layer 61 is removed, and the carbon synthesizing catalyst layer 62 remains between adjacent noble metal-including sheets 52a.

The porogen may be removed by, e.g., washing using a washing agent. As the washing agent, an acidic solution or alkaline solution is used. Alternatively, the pore forming agent may be removed by electrolysis. In some cases, the porogen may be removed by combining washing and electrolysis. When using Al as the porogen and Ni as the fibrous nanocarbon synthesizing catalyst, an alkali solution can be used as the washing agent.

By removing the porogen, it is possible to obtain a gap-including stack 66 including plural noble metal-including sheets 52a, gap layers 64, and fibrous nanocarbon synthesizing catalyst layers 62. A structure (metal portion) in which the noble metal-including sheets 52a are stacked with the gap layers 64 being sandwiched between them is formed by self-organization. This structure and the fibrous nanocarbon synthesizing catalyst layer 62 form a physically connected continuous body. Note that the removal of the porogen by this process is often insufficient, but the residual porogen can be removed by later processing.

Figure 4C:
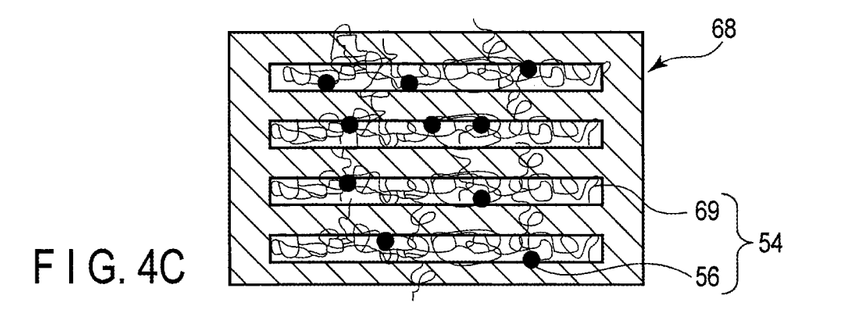

Subsequently, fibrous nanocarbon is synthesized by thermal CVD. Thermal CVD may, for example be performed at 300° C. to 700° C. using a carbon-including gas such as $C_2H_4$. Consequently, fibrous nanocarbon 69 is generated as shown in FIG. 4C, thus the porous nanocarbon layer 54 is formed between adjacent noble metal-including sheets 52a, thereby obtaining a fiber-including stack 68. In the porous nanocarbon layer 54, the carbon synthesizing catalyst 56 exists together with the fibrous nanocarbon 69. Note that fibrous nanocarbon can also be synthesized at a lower temperature, such as 200° C., by plasma CVD. Furthermore, the orientation of the fibrous nanocarbon can be controlled by a bias voltage. By doing so, in some cases, the movement of a substance such as the discharge of water becomes smoother, thereby further improving the properties of the electrochemical cell.

Figure 4D:
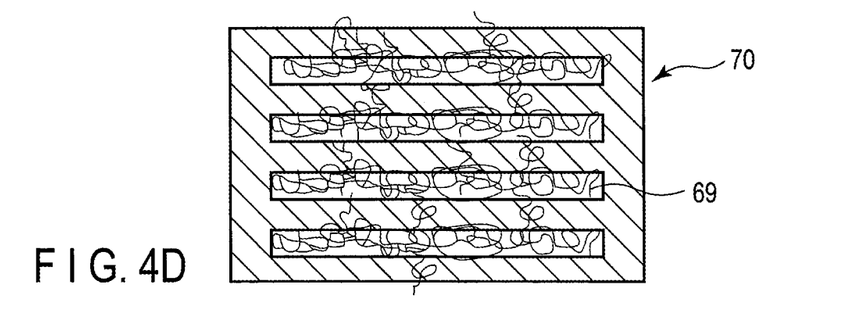

Finally, a porous catalyst layer 70 of the embodiment as shown in FIG. 4D is obtained by removing the carbon synthesizing catalyst 56 and the residual porogen. The carbon synthesizing catalyst 56 may be removed by, e.g., washing using an acidic solution. Examples of the acidic solution are nitric acid, hydrochloric acid, sulfuric acid, and solution mixtures thereof. The carbon synthesizing catalyst 56 is removed from the fiber-including stack 68 by immersing the fiber-including stack 68 in such an acidic solution for about 5 min to 50 hrs. Here, the acidic solution may be heated to about 50° C. to 100° C. Alternatively, dissolution of the pore forming metal may be promoted by applying a bias voltage. A heat treatment can also be performed after such a process.

When the pore forming metal dissolves, the catalyst material may elute out into the washing agent, in some cases. This can be suppressed by fixing the starting stack 60 to a substrate beforehand. More specifically, a polymer solution such as Nafion® (available from DuPont) is impregnated into the starting stack 60, then the material is dried, and thereafter the pore forming metal is dissolved. Oxygen dissolved in the washing agent may be removed, as required.

A polymer solution such as Nafion® (available from DuPont) may be added to the obtained porous catalyst layer 70 by spraying or impregnation. Thereby, the proton conductivity of the porous catalyst layer 70 can be increased. In addition, adhesion between the porous catalyst layer 70 and other members can be increased. A water repellent may also be added to adjust the water repellency of the porous catalyst layer 70. Examples of the water repellent are polytetrafluoroethylene (PTFE), polyvinylidene fluoride (PVDF), polyhexafluoropropylene, a tetrafluoroethylene-hexafluoropropylene copolymer (FEP), and hydrophobized silica.

The porogen may partially remain in the porous catalyst layer 70 of the embodiment. The residual porogen presumably forms a stable oxide, and contributes to suppressing the growth of the catalyst material, maintaining the structure of the catalyst layer, and promoting proton conduction. Note that the fibrous carbon synthesizing catalyst 56 often remains in the catalyst layer even after washing. The remaining carbon synthesizing catalyst 56 presumably contributes to improving the properties as, e.g., an oxide as a water absorption source. Of the metal components of metal in the porous catalyst layer 70, the included amount of Ni, Co, and Fe are desirably 0.5 atom % to 50 atom %.

Note that in order to control the form and generation amount of the fibrous nanocarbon, a promotor of the nanocarbon synthesizing catalyst may be introduced to the nanocarbon synthetic catalyst layer. As the promotor, another material such as Cu may be used. In some cases, by using the promotor, the fuel cell may be improved in terms of the power generation property or humidity dependence.

The MEA according to the embodiment may be manufactured by, e.g., the following procedure using the above-described porous catalyst layer 70 as at least one of the first and second catalyst layers 5 and 7.

First, the catalyst layer 5 is transferred onto the gas diffusion layer 6, and the catalyst layer 7 is transferred onto the gas diffusion layer 8. The MEA 1 is obtained by sandwiching the electrolyte membrane 4 between the two catalyst layers, stacking them as shown in FIG. 1, and bonding them by heating and pressurizing. Alternatively, at least one of the catalyst layers 5 and 7 may be transferred onto the electrolyte membrane 4, and then the gas diffusion layer may be disposed on the catalyst layer. The MEA 1 is obtained by stacking these layers as shown in FIG. 1, and assembling them by heating and pressurizing.

Bonding of each of the members is generally performed using a hot press machine. The pressing temperature is higher than the glass transition temperature of a polymer electrolyte used as a binder in the electrodes 2 and 3 and electrolyte membrane 4, and is generally 100° C. to 400° C. The pressing pressure is generally 5 to 200 kg/cm², although it depends on the hardness of the electrodes 2 and 3.

As described above, the MEA 1 according to the embodiment uses the porous catalyst layer according to the embodiment as at least one of the first and second catalyst layers 5 and 7, and hence has excellent properties when highly humid fuel is supplied.

Figure 5:
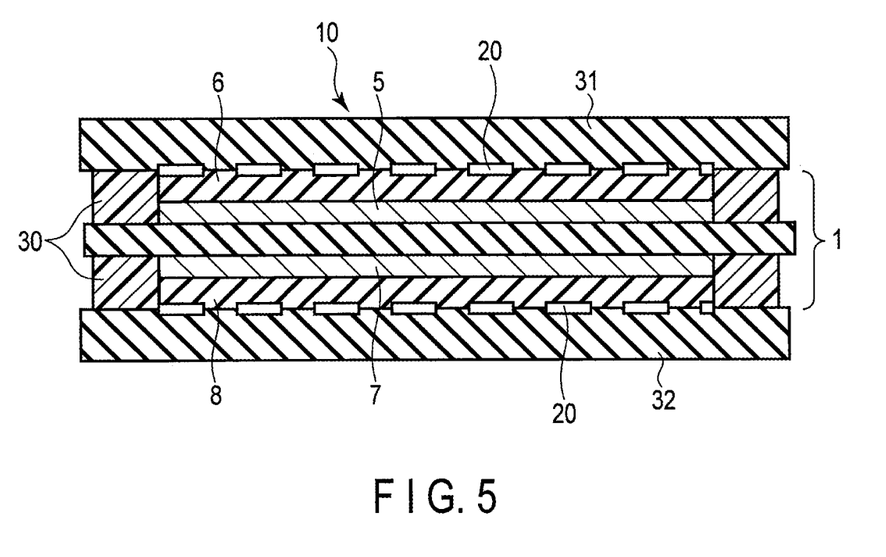
FIG. 5 is a schematic view showing an example of an electrochemical cell according to an embodiment.

FIG. 5 is a schematic view showing an example of an electrochemical cell according to the embodiment. This electrochemical cell shown in FIG. 5 will be explained as a single cell of a fuel cell.

A single cell 10 has a structure in which the MEA 1 shown in FIG. 1 is sandwiched between a first separator (i.e., an anode separator) 31 and a second separator (i.e., a cathode separator) 32. Assume here, that the first electrode 2 is an anode, and the second electrode 3 is a cathode.

Each of the anode separator 31 and cathode separator 32 includes channels 20 for suppling air and fuel to the MEA 1. Seals 30 are arranged on reverse side surfaces of each of the catalyst layers 5 and 7 and gas diffusion layers 6 and 8, thereby preventing a fuel leak and oxidizing agent leak from the MEA 1.

A fuel cell 100 is obtained by stacking plural single cells 10, and connecting them in series. A higher electromotive force can be obtained when using plural MEAs 1. The shape of the fuel cell is not particularly limited, and is selected appropriately in accordance with the desired cell properties such as voltage. The fuel cell is not limited to a stacked structure and may have a planar arranged structure. In addition, the number of single cells included in the fuel cell is not particularly limited, either.

As fuel, it is possible to use an aqueous solution including at least one kind of material selected from the group consisting of hydrogen, a reformed gas, methanol, ethanol, and formic acid.

The electrochemical cell according to the embodiment may also be an electrolytic cell or an MEMS (Micro Electro Mechanical Systems) type electrochemical cell. For example, the electrolytic cell may have the same arrangement as that of the above-described fuel cell except that the electrolytic cell includes an oxygen generating catalyst electrode as the first electrode 2 instead of the anode.

The electrochemical cell according to the embodiment includes the MEA including the porous catalyst layer of the embodiment, which is favorable in terms of an environmental humidity dependence even with a small amount of used noble metal. Therefore, desired properties can be obtained while reducing the amount of noble metal used.

Examples and Comparative Examples will be explained below.

<Manufacture of Catalyst Layer>

EXAMPLES 1-16

Table 1 below shows the arrangements of the porous catalyst layers of Examples 1 to 16, and the materials and the like used for manufacture. Of the materials, regarding the carbon synthesizing material, the thickness (nm) of the carbon synthesizing catalyst layer is shown together with the kind of metal or alloy as the carbon synthesizing catalyst.

TABLE 1

| | Noble Metal-including Sheet | | | Carbon Synthesizing |
|---|---|---|---|---|
| | Composition | Thickness (nm) | Porosity (Vol. %) | Porogen | Catalyst (nm) |
| Example 1 | PtCo$_2$ | 7 | 40 | Al | NiCuAl (15) |
| Example 2 | PtCoMn | 9 | 40 | Al | NiAl (20) |
| Example 3 | PtCo$_3$ | 10 | 30 | Al | NiFe (15) |
| Example 4 | PtCoAl | 20 | 50 | Zn | NiCo (10) |
| Example 5 | PtNiMn | 15 | 40 | Sn | NiCuNi (30) |
| Example 6 | PtCo$_2$Ta | 10 | 40 | Al | NiCoAl (10) |
| Example 7 | PtNbTi | 10 | 30 | Al | NiCu (20) |
| Example 8 | PtCo$_3$Ni | 15 | 50 | Al | Ni (15) |
| Example 9 | PtSnMn | 8 | 30 | Al | NiAl (20) |
| Example 10 | Pt$_2$CoNi | 8 | 30 | Al | NiCoAl (30) |
| Example 11 | PtCoMn | 10 | 30 | Al | NiCuAl (10) |
| Example 12 | PtCo$_2$ | 8 | 25 | Al | CoAl$_2$ (10) |
| Example 13 | PtCo$_2$ | 20 | 30 | Al | NiAl$_2$ (30) |
| Example 14 | PtCo$_2$ | 8 | 40 | Al | NiAl (25) |
| Example 15 | PtCo$_2$ | 20 | 30 | Al | NiAl$_3$ (5) |
| Example 16 | Pt | 2.5 | 0 | Al | CoAl (20) |

As a substrate, carbon paper Toray 060 (available from Toray) having a 1 to 50 μm thick carbon layer on the surface was prepared. A noble metal-including sheet 52*a* was formed on this substrate by sputtering, and a carbon synthesizing catalyst material layer 62 and a porogen layer 61 were formed thereon by sputtering, thereby obtaining an interlayer 63 of 20 to 600 nm thickness. As the porogen, one of Al, Zn, and Sn was used.

Noble metal-including layers 52*a* and interlayers 63 were sequentially formed such that the catalyst loading amount was 0.1 mg/cm$^2$, thereby obtaining a starting stack 60 as shown in FIG. 4A. Note that the catalyst loading amount represents the amount of catalyst (noble metal) in an electrode area of 1 cm$^2$.

When performing sputtering, the composition of the noble metal-including sheet 52*a* was adjusted such that the porosity of the noble metal-including sheet 52*a* would be of values shown in Table 1 above.

An alkali treatment was performed by immersing the obtained starting stack in an aqueous NaOH solution (pH: 10 to 14) at 60° C. to 100° C. for 30 min. After this alkali treatment was repeated twice, the starting stack was washed with pure water and dried, thereby obtaining a gap-including stack 66 as shown in FIG. 4B.

Subsequently, fibrous nanocarbon was formed in the catalyst layers by thermal CVD, thereby manufacturing a fiber-including stack 68 including porous nanocarbon layers 54 including fibrous nanocarbon 69 (FIG. 4C).

Then, an acid treatment was performed by immersing the stack in an aqueous 0.5-M sulfuric acid solution at 60° C. to 100° C. for 30 min.

After this acid treatment was repeated twice, the stack was washed with pure water. Finally, a porous catalyst layer 70 was obtained by drying the stack (FIG. 4D).

Table 2 below shows the arrangements of catalyst layers of Comparative Examples 1 to 3, and the materials and the like used for manufacture. Since no carbon synthesizing catalyst was used for these comparative examples, the thickness of carbon synthesizing catalyst layer was 0 nm.

TABLE 2

| | Noble Metal-including Sheet | | | | Carbon Synthesizing |
|---|---|---|---|---|---|
| | Composition | Thickness (nm) | Porosity (Vol. %) | Porogen | Catalyst (nm) |
| Comparative Example 1 | Pt | 2.5 | 0 | Al | — (0) |
| Comparative Example 2 | Pt | 2.5 | 0 | — | — (0)* |
| Comparative Example 3 | Pt (Standard) | — | — | — | — |

*For Comparative Example 2, nanocarbon was not synthesized by a carbon synthesizing catalyst in the catalyst layer.

More specifically, the catalyst layers of the Comparative Examples were manufactured as follows.

COMPARATIVE EXAMPLE 1

A catalyst layer of Comparative Example 1 was obtained following the same procedure as in Example 1, except that the arrangement was changed as shown in Table 2 above.

COMPARATIVE EXAMPLE 2

Figure 6A:
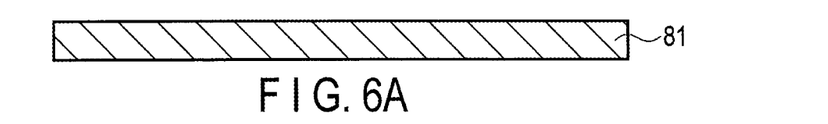
FIGS. 6A, 6B, and 6C are schematic views showing a method of manufacturing a catalyst layer of a comparative example.
Figure 6B:
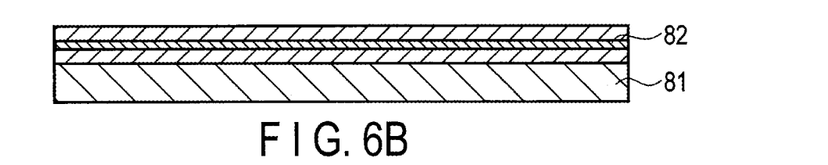
Figure 6C:
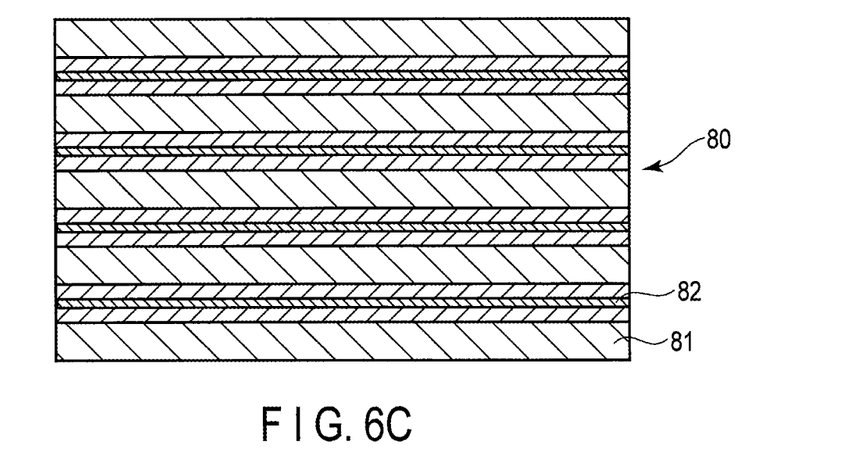

A catalyst layer having an arrangement as shown above in Table 2 was formed following the procedure shown in FIGS. 6A, 6B, and 6C using the same substrate as in the above-described working examples. As shown in FIG. 6A, a platinum sheet 81 was formed on the substrate (not shown) by sputtering, and the substrate was removed from a sputtering apparatus. The surface of the platinum sheet 81 was coated with nanocarbon fibers by spraying, thereby forming a nanocarbon fiber layer 82 as shown in FIG. 6B. The thickness of the nanocarbon fiber layer 82 was 5 µm.

A platinum sheet was formed on the nanocarbon fiber layer by the same method. Nanocarbon fiber layers 82 and platinum sheets 81 were sequentially stacked such that the total loading amount of the catalyst was 0.10 mg/cm$^2$, thereby obtaining a stack 80 as shown in FIG. 6C.

Finally, the obtained stack was washed with acid and pure water following the same procedure as in the working examples, and thereafter the stack was dried, thereby obtaining a catalyst layer of Comparative Example 2.

COMPARATIVE EXAMPLE 3

2 g of a commercially available particulate Pt catalyst (Model No. TEC10E50E-HT manufactured by TANAKA KIKINZOKU), 5 g of pure water, 5 g of a 20% Nafion® (manufactured by DuPont) solution, and 20 g of 2-ethoxyethanol were mixed. The obtained mixture was sufficiently dispersed by stirring, thereby forming slurry.

Hydrophobized carbon paper (350 µm, available from Toray) was prepared, and the surface of this carbon paper was coated with the slurry by using a control coater, and dried. Consequently, a Pt standard electrode in which the loading density of the Pt catalyst was 0.1 mg/cm$^2$ was obtained.

MEAS were assembled using the catalyst layers obtained in Examples 1 to 16 and Comparative Examples 1 and 2 as cathodes, and evaluated. More specifically, a 2.3 cm×2.3 cm square piece was cut out from each of the catalyst layers manufactured in Examples 1 to 16 and Comparative Examples 1 and 2, and used as a cathode. The area of the cathode was about 5 cm$^2$. The Pt standard electrode of Comparative Example 3 was used as an anode.

Nafion® 212 (manufactured by DuPont) was sandwiched between the cathode and anode, and these members were adhered together by performing hot press bonding at a temperature of 125° C. and a pressure of 30 kg/cm$^2$ for 5 min, thereby obtaining MEA.

For comparison, an MEA standard was manufactured using the above-described standard electrode as both the cathode and anode.

<Manufacture of Single Cell of Fuel Cell>

A single cell of a polyelectrolyte fuel cell was manufactured by sandwiching each of the obtained MEA between first and second separators. Channels are formed in each of the first and second separators.

The following items were evaluated using the manufactured catalyst layer, MEA, and single cell.

1. Porosity of noble metal-including sheet, maximum distance between noble metal-including sheets, proportion of nanocarbon between noble metal-including sheets, and proportion of continuous noble metal-including sheets First, the catalyst layers obtained in Examples 1 to 16 and Comparative Examples 1 and 2 were cut. For example, when the catalyst layer was rectangular, the center of the short side was cut parallel to the long side. In a similar manner, the Pt standard electrode of Comparative Example 3 was also cut. The position at the center of the cut cross-sectional surface of each catalyst layer was observed with an SEM.

The catalyst layers of Examples 1 to 16 and Comparative Examples 1 and 2 were confirmed of having a multilayered structure including plural noble metal-including sheets. In Examples 2 to 16, the noble metal-including sheets had pores.

In the catalyst layers except that of Comparative Example 2, the plural noble metal-including sheets included portions in contact with each other. Also, the catalyst layers of Examples 1 to 16 each had porous nanocarbon layers including fibrous nanocarbon between adjacent noble metal-including sheets. The electrode of Comparative Example 3 had a single-layered structure including pores.

The catalyst layer or standard electrode was cut into an upper portion, middle portion, and lower portion in the thickness direction. Furthermore, three positions of each portion were observed with a TEM. TEM images at a magnification of 400,000 to 800,000 of a total of nine fields of view were obtained, and the contrast was used to distinguish between the catalyst material and pores in the noble metal-including sheet. For the noble metal-including sheet in each field of view, the area occupied by the pores was measured. Based on this area, the volume occupied by the pores in the noble metal-including sheet was calculated. The proportion of volume occupied by the pores in the noble metal-including sheet was calculated for each field of view, and the average value of the nine fields of view was taken as the porosity of the noble metal-including sheet.

Table 3 below shows the maximum distance between noble metal-including sheets, proportion of fibrous nanocarbon, and proportion of continuous noble metal-including sheets in the Examples and Comparative Examples.

TABLE 3

| | Maximum distance between Noble Metal-including Sheets (nm) | Proportion of Nanocarbon (Vol. %) | Proportion of continuous Noble Metal-including Sheets (%) |
|---|---|---|---|
| Example 1 | 200 | 40 | 60 |
| Example 2 | 150 | 30 | 60 |
| Example 3 | 100 | 35 | 80 |
| Example 4 | 80 | 10 | 80 |
| Example 5 | 100 | 30 | 80 |
| Example 6 | 200 | 35 | 50 |
| Example 7 | 100 | 40 | 60 |
| Example 8 | 300 | 50 | 40 |
| Example 9 | 400 | 55 | 30 |
| Example 10 | 150 | 60 | 60 |
| Example 11 | 30 | 20 | 100 |
| Example 12 | 50 | 5 | 60 |
| Example 13 | 100 | 70 | 80 |
| Example 14 | 500 | 60 | 20 |
| Example 15 | 20 | 10 | 100 |
| Example 16 | 100 | 25 | 80 |
| Comparative Example 1 | 100 | 0.0 | 100 |
| Comparative Example 2 | — | 30 | 0 |
| Comparative Example 3 | — | — | — |

The maximum distance between noble metal-including sheets was obtained by the following method. The catalyst layer was cut into an upper portion, middle portion, and lower portion in the thickness direction. Furthermore, three positions of each portion were observed by SEM. SEM images at a magnification of 10,000 to 200,000 of a total of nine fields of view were obtained, and the contrast was used to distinguish noble metal-including sheets from nanocarbon and pores located in between them. The distance between the noble metal-including sheets at both ends of the catalyst layer in the direction of the catalyst layer thickness was measured in each field of view, thereby obtaining the maximum distance of the catalyst layer in each field of view. This maximum distance was divided by the number of noble metal-including sheets existing in the maximum distance, thereby obtaining the maximum distance between noble metal-including sheets. The average value of the nine fields of view was taken as the maximum distance between the noble metal-including sheets.

The proportion of fibrous nanocarbon between noble metal-including sheets was obtained by the following method. The catalyst layer was cut into an upper portion, middle portion, and lower portion in the thickness direction. Furthermore, three positions of each portion were observed by SEM. SEM images at a magnification of 200,000 of a total of nine fields of view were obtained, and the contrast was used to distinguish between nanocarbon and pores located in between noble metal-including sheets. The areas occupied by nanocarbon and pores were measured, and the proportion occupied by the nanocarbon was calculated. The average value of the nine fields of view was taken as the proportion of nanocarbon.

Information for a cross-section in only one direction of the catalyst layer is obtained from cross-sectional observation by SEM. As shown in FIG. 2, however, the end portions E1 and E2 of the plural noble metal-including sheets 52a were confirmed to be in contact with each other. To quantitatively evaluate the continuity of the plural noble metal-including sheets, in the SEM sectional observation for the present embodiment, the proportion of the continuous noble metal-including sheet 52a was defined as follows.

Of the plural noble metal-including sheets, a noble metal-including sheet including a portion in contact with another noble metal-including sheet was regarded as a continuous noble metal, and a noble metal-including sheet not including a portion in contact with another noble metal-including sheet was regarded as an independent noble metal-including sheet. SEM images at a magnification of 10,000 to 50,000 of a total of nine fields of view were obtained, and plural noble metal-including sheets 52a were distinguished using contrast. The total area of the independent noble metal-including sheets was measured. The proportion (%) occupied by the independent noble metal-including sheets relative to the whole of the noble metal-including sheets in each field of view was calculated, and the average value of the nine fields of view was taken as the proportion (%) of the independent noble metal-including sheets. Since the proportion (%) of the continuous noble metal-including sheets=100×(1−proportion of independent noble metal-including sheets), the proportion of the continuous noble metal-including sheets was obtained from this equation.

Even when a noble metal-including sheet is identified as an independent noble metal-including sheet in the cross-section observed by SEM, the sheet may be in contact with another noble metal-including sheet in a different direction. Accordingly, the proportion of the continuous noble metal-including sheets calculated by this measurement method is presumably lower than an actual value.

2. Cell Voltage and Humidity Dependence

One day conditioning was performed on the obtained single cell. After that, the cell was maintained at 80° C., hydrogen was supplied as fuel to the anode, and air was supplied to the cathode. The flow rate of hydrogen was set at 100 mL/min, and the flow rate of air was set at 200 mL/min. The relative humidity of each of hydrogen and air was 60%. While hydrogen and air were supplied, an electric current was discharged at a current density of 0.8 A/cm$^2$, and the cell voltage ($V_c$) after 10 minutes was measured.

Table 4 below shows the results as the cell voltage. The same measurement as described above was performed except that the humidity of hydrogen and air was changed to 100%. In accordance with a change ($\Delta V_c$) in cell voltage, the humidity dependence was evaluated by A, B, or C as follows.

$\Delta V_c \leq 25$ mV: humidity robustness A
$25 < \Delta V_c \leq 50$ mV: humidity robustness B
$\Delta V_c > 50$ mV: humidity robustness C Table 4 below shows the results obtained for the above evaluation item. The humidity robustness is considered satisfactory, if the evaluation is A or B.

3. Durability

Figure 7:
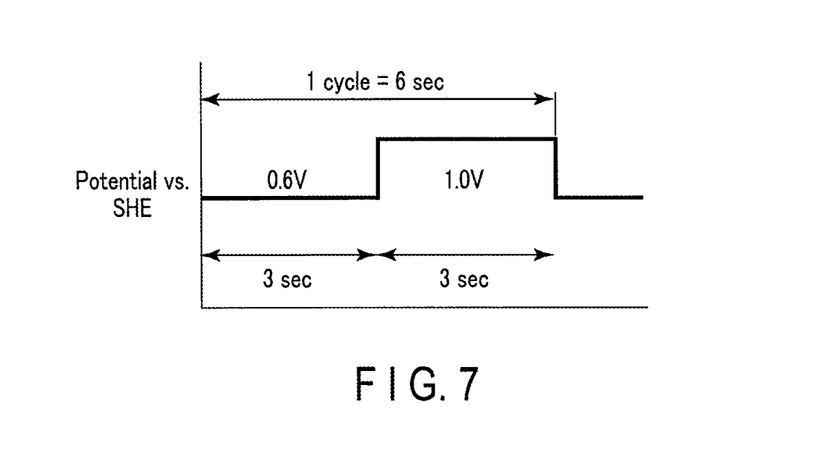
FIG. 7 is a view showing a durability protocol.

The durability was evaluated in accordance with a durability protocol shown in FIG. 7. Note that (SHE) on the vertical axis shown in FIG. 7 means a (standard hydrogen electrode). The single cell was maintained at 80° C. while supplying hydrogen to the anode at a flow rate of 20 mL/min, and nitrogen to the cathode at a flow rate of 20 mL/min. The relative humidity of each of hydrogen and nitrogen was 100%. In this state, the cell voltage was raised from 1.0 V to 1.5 V over 1 second and decreased to 1.0 V over 1 second, thereby performing one cycle. This cycle was repeated a total of 30,000 times.

After that, the cell was maintained at 80° C., hydrogen was supplied as fuel to the anode at a flow rate of 120 mL/min, and air was supplied to the cathode at a flow rate of 250 mL/min. The relative humidity of each of hydrogen and air was 60%. An electric current was discharged at a current density of 1 A/cm$^2$, and the cell voltage ($V_1$) after 10 minutes was measured. A decrease rate ($100 \times (V_c - V_1)/V_c$) was obtained by comparison with the cell voltage ($V_c$) before durability evaluation. Here, $V_c$ represents the cell voltage before durability evaluation. The durability was evaluated as follows in accordance with the decrease rate of the cell voltage.

10% or less: A
more than 10% and 20% or less: B
more than 20%: C

Table 4 below shows the results obtained for the above evaluation item. The durability is considered satisfactory, if the evaluation is A or B.

TABLE 4

| | Cell Voltage (V) | Humidity Dependence | Resistivity |
|---|---|---|---|
| Example 1 | 0.71 | A | A |
| Example 2 | 0.71 | A | A |
| Example 3 | 0.70 | A | A |
| Example 4 | 0.71 | A | A |
| Example 5 | 0.71 | A | A |
| Example 6 | 0.70 | A | A |
| Example 7 | 0.71 | A | A |
| Example 8 | 0.70 | A | A |
| Example 9 | 0.71 | A | A |
| Example 10 | 0.70 | A | A |
| Example 11 | 0.69 | A | A |
| Example 12 | 0.66 | B | A |
| Example 13 | 0.67 | B | A |
| Example 14 | 0.68 | B | A |
| Example 15 | 0.66 | B | A |
| Example 16 | 0.69 | B | A |
| Comparative Example 1 | 0.65 | C | A |
| Comparative Example 2 | 0.60 | B | A |
| Comparative Example 3 | 0.60 | A | C |

As shown in Table 3 above, the proportion of the continuous noble metal-including sheets was 20% or more in all of the catalyst layers of Examples 1 to 16. Note that these values were measured from cross-sectional observation by SEM. Since the noble metal-including sheet may be in contact with another noble metal-including sheet in a direction different from the cross-sectional direction, it can be presumed than the noble metal-including sheets actually continue at a proportion higher than these values.

Also, the included amount of fibrous nanocarbon was 5% to 70% in the catalyst layers of Examples 1 to 16. Table 4 above shows that the cell voltage of the single cell including the catalyst layer of the working examples was high, and the humidity dependence and durability were favorable.

These results can be summarized as follows.

The humidity robustness and durability were A in the catalyst layers of Examples 1 to 11, but the humidity robustness was limited to B in the catalyst layers of Examples 12 to 16. The proportion of fibrous nanocarbon in the catalyst layer was 5% in Example 12, and the proportion of fibrous nanocarbon in the catalyst layer was 70% in Example 13. This indicates that the humidity robustness improves when the included amount of fibrous nanocarbon in the catalyst layer is optimized.

In the catalyst layer of Example 14, the maximum distance between noble metal-including sheets was 500 nm. The cell voltage was presumably slightly low because the proportion of the continuous noble metal-including sheets was low, such that the utilization efficiency of the catalyst was low.

In the catalyst layer of Example 15, the maximum distance between noble metal-including sheets was 20 nm, and the cell voltage was 0.66 V, i.e., slightly low. The main cause of this was presumably that sufficient pores were not present. The cell voltage was slightly low in Example 16, as well. Presumably, the noble metal-including sheets did not include pores in the catalyst layer of Example 16, and thus, the noble metal utilization efficiency had decreased.

For the catalyst layers of Examples 1 to 11, a high cell voltage, high humidity robustness, and high durability was presumably obtained because the maximum distance between noble metal-including sheets, the proportion of continuous noble metal-including sheets, and the included amount of fibrous nanocarbon in the catalyst layer were each optimized.

Since the catalyst layer of Comparative Example 1 did not include fibrous nanocarbon, the change ($\Delta V_c$) in cell voltage was large, and the humidity robustness was inferior. In the catalyst layer of Comparative Example 2, each of the individual noble metal-including sheets was independent, and the cell voltage was low due to a low catalyst utilization efficiency. In the catalyst layer of Comparative Example 3, which did not include a porous nanocarbon layer, the cell voltage was low, and in addition, the durability was inferior.

When used in a single cell of a fuel cell, the catalyst layers of Examples 1 to 16 have all of a high cell voltage, good humidity robustness, and high durability. In the case that the catalyst layers of Comparative Examples 1 to 3 are used, a high cell voltage, good humidity robustness, and high durability cannot be achieved together.

According to at least one embodiment explained above, by including a metal portion including plural noble metal-including sheets stacked apart from each other, the metal portion having a portion where the plural noble metal-including sheets are integrated, and a porous nanocarbon layer disposed between two adjacent noble metal-including sheets and including fibrous nanocarbon, it is possible to provide a porous catalyst layer having a high cell voltage, good humidity robustness, and high durability even with a small amount of noble metal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A porous catalyst layer comprising:
a metal portion including plural noble metal-including sheets stacked apart from each other, the metal portion having a portion where the plural noble metal-including sheets are integrated at both end portions thereof; and
a porous nanocarbon layer disposed between two adjacent noble metal-including sheets of the plural noble metal-including sheets and including fibrous nanocarbon,
wherein the fibrous nanocarbon occupies 10 vol. % to 60 vol. % of the porous nanocarbon layer between the two adjacent noble metal-including sheets, and a maximum distance between the two adjacent noble metal-including sheets is 100 nm to 400 nm.

2. The porous catalyst layer according to claim 1, wherein the porous nanocarbon layer includes at least one type of element selected from the group consisting of Ni, Co, and Fe in an amount of 0.5 atom % to 50 atom %.

3. A membrane electrode assembly comprising:
a pair of electrodes spaced apart from each other and facing each other; and
an electrolyte membrane inserted between the pair of electrodes,
wherein at least one electrode of the pair of electrodes includes the porous catalyst layer according to claim 1.

4. An electrochemical cell comprising:
the membrane electrode assembly according to claim 3; and
a pair of separators sandwiching the membrane electrode assembly.

5. The porous catalyst layer according to claim 1, wherein the porous catalyst layer comprises a catalyst material comprising at least one selected from the group consisting of Pt, Ru, Rh, Os, Ir, Pd, and Au.

6. The porous catalyst layer according to claim 1, wherein the porous catalyst layer comprises 20 atom % or more of at least one selected from the group consisting of Pt, Ir, Ru, Au, Pd, Rh, and Ag.

7. The porous catalyst layer according to claim 1, wherein the porous catalyst layer comprises an alloy having a composition $Pt_Y Ru_Z T_{1-Y-Z}$, where Y is $0.2 \leq Y \leq 0.8$, Z is $0 \leq Z \leq 0.8$, and an element T is at least one selected from the group consisting of W, Hf, Si, Mo, Ta, Ti, Zr, Ni, Co, Nb, V, Sn, Al, and Cr.

8. The porous catalyst layer according to claim 1, wherein the porous catalyst layer comprises an alloy having a composition $Pt_U M_{1-U}$, where U is $0 < U \leq 0.9$, and an element M is at least one selected from the group consisting of Co, Ni, Fe, Mn, Ta, W, Hf, Si, Mo, Ti, Zr, Nb, V, Cr, Al, and Sn.

9. The porous catalyst layer according to claim 1, wherein the porous catalyst layer comprises an oxide of at least one selected from the group consisting of Ir, Ru, Pt, Au, Rh, and Os.

10. The porous catalyst layer according to claim 9, wherein the porous catalyst layer comprises a composite oxide of the oxide of at least one selected from the group consisting of Ir, Ru, Pt, Au, Rh, and Os and an oxide of Ta or Sn.

11. The porous catalyst layer according to claim 1, wherein a porosity of the plural noble metal-including sheets is 20 vol. % to 80 vol. %.

12. The porous catalyst layer according to claim 1, wherein an aspect ratio of the fibrous nanocarbon is 3 or more, and 80% of the fibrous nanocarbon has a diameter of 2 nm to 200 nm.

13. The porous catalyst layer according to claim 1, wherein the porous catalyst layer is obtained by a method comprising:
- disposing an interlayer including a porogen and a carbon synthesizing catalyst between adjacent noble metal-including sheets to obtain a starting stack;
- removing the porogen from the starting stack, and integrating the noble metal-including sheets at both end portions to obtain a gap-including tack;
- synthesizing fibrous nanocarbon by thermal CVD to obtain a fiber-including stack that comprises the fibrous nanocarbon, and
- removing the carbon synthesizing catalyst from the fiber-including stack.

14. The porous catalyst layer according to claim 13, wherein the interlayer is formed by sputtering or vapor deposition.

* * * * *